April 11, 1933.  W. C. EDWARDS  1,903,589
TIRE PRESSURE RESPONSIVE SWITCH
Filed Oct. 10, 1930
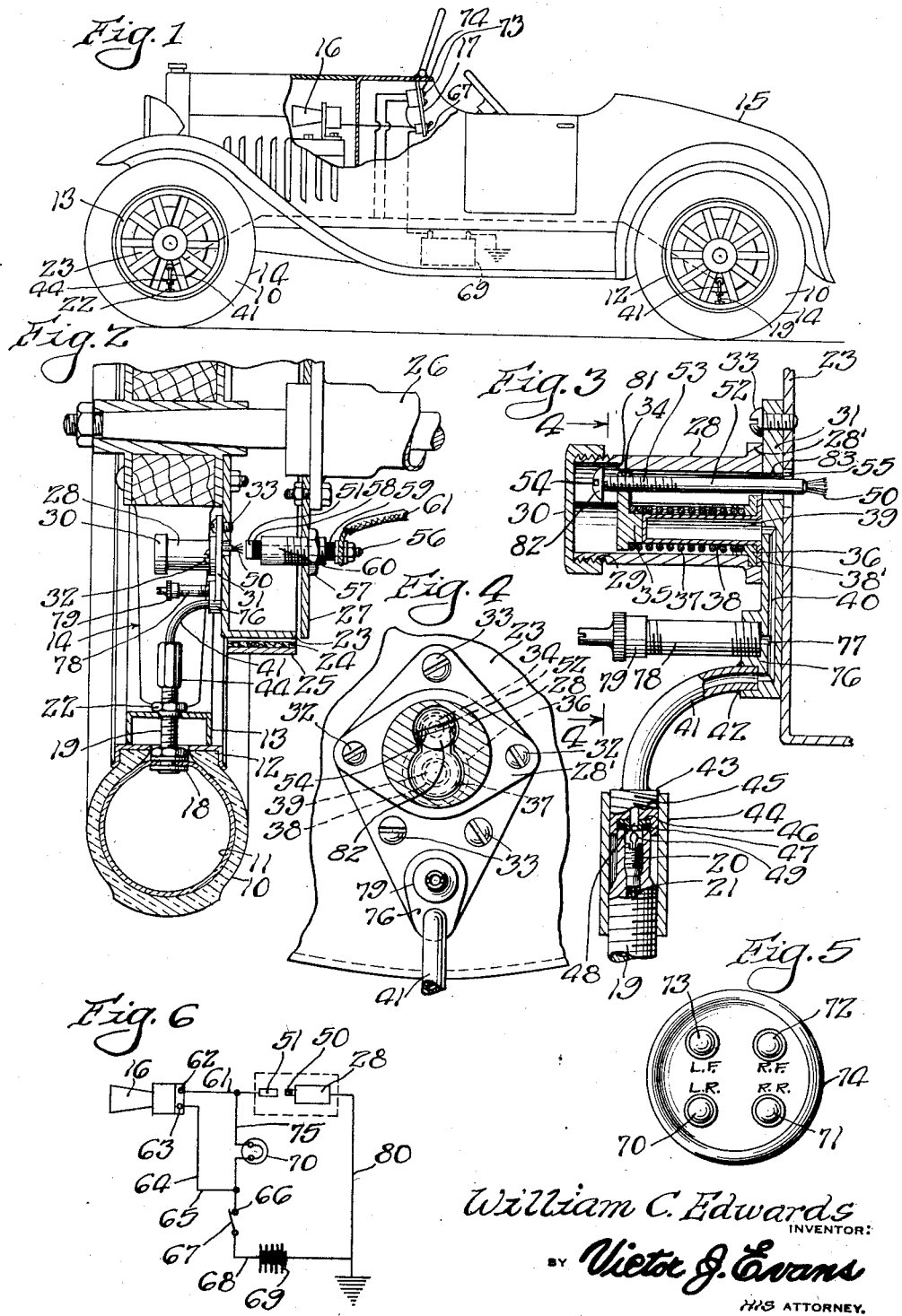
William C. Edwards
INVENTOR
BY Victor J. Evans
HIS ATTORNEY.

Patented Apr. 11, 1933

1,903,589

UNITED STATES PATENT OFFICE

WILLIAM C. EDWARDS, OF BATTLE CREEK, MICHIGAN

TIRE PRESSURE RESPONSIVE SWITCH

Application filed October 10, 1930. Serial No. 487,824.

This invention relates to certain novel improvements in tire pressure indicating devices, and has for its principal object the provision of an improved construction of this character which will be highly efficient in use and economical in manufacture.

The salient object of this invention is the provision of an improved tire pressure responsive switch for controlling circuit to means indicating to the driver of an automotive vehicle when the pressure of the air in his tires, for any reason, falls below normal.

Another object of the invention, ancillary to the foregoing object, is the provision of an improved switch of the character described herein which is preferably so arranged that when the air pressure in one of the tires of the machine falls below the desired normal pressure circuit will be closed to an individual signal light which will be illuminated on the instrument board of the machine while the switch may be so arranged that it will likewise control circuit to the driver's horn so as to apprise the driver of the fall in the air pressure of one or more of his tires.

Other objects will appear hereinafter.

The invention consists in the novel combination and arrangement of parts to be hereinafter described and claimed.

The invention will be best understood by reference to the accompanying drawing, showing the preferred form of construction and in which:

Fig. 1 is a side elevational view of a typical automobile showing the invention in operative position;

Fig. 2 is a vertical sectional detail view depicting the invention in operative position as seen in Fig. 1;

Fig. 3 is a sectional detail view taken substantially on the line 3—3 in Fig. 2;

Fig. 4 is a plan view partly in section, taken substantially on the line 4—4 in Fig. 3;

Fig. 5 is a plan view of a preferred arrangement of signal lights embodied in the invention; and Fig. 6 is a schematic wiring diagram of a preferred circuit embodied in the invention.

As is well known, it is particularly desirable in the use of balloon tires that the pressure desired to be maintained in these tires be kept normal so as to prevent injury to the fabric of the tires. It is, therefore, among the several objects of this invention to provide an improved switch to control circuit to means for apprising the driver of an automobile or like vehicle when the pressure in any one or more of his tires falls belows the desired normal pressure so that injury to the tire and danger of accident due to blow outs, etc., will be reduced to a minimum.

Referring to the drawing wherein a preferred embodiment of the invention is depicted, indicated at 10 is a tire, of any approved construction, interiorly of which is provided the inner tube 11. As is well understood in the art, the tires 10 are retained in position on rims 12 with which are associated the felloes 13 of the wheels generically indicated at 14, the wheels 14 being a part of the car generically indicated at 15. As shown in Fig. 1, a part of the body and hood of the car 15 are broken away to reveal the horn 16 and the instrument board 17 with which the invention is associated in a manner to be described hereinafter.

Referring now particularly to Figs. 2 and 3, there is secured to the inner tube 11 by means of vulcanization, and suitable nut and washer structures 18, a valve stem 19 which may be of any approved type so as to house a suitable spring actuated air valve 20 which includes a needle 21. As is well understood in the art, the valve stem 19 projects through the rim 12 and the felloe 13 and is secured in position on the felloe 13 by means of a suitable nut 22.

There is provided on the car 15 the usual brake drums 23, brake linings 24, and brake bands 25 which are associated with the hub and axle structures generically indicated at 26, in a manner well understood in the art. Likewise provided on the open side of each of the brake drums 24 is the usual mud guard 27.

My improved switch includes a housing 28, which is threaded exteriorly as at 29 to receive the threaded cap 30. The housing 28 includes a flange portion 28' which is secured to a plate 31 by means of screws 32 and the plate 31 is secured to the brake drum 23 by means of screws 33.

The housing 28 has slidably mounted therein a piston 34, on which is a boss 35. Having one end thereof mounted on the boss 35 and having the opposite end connected to the member 36 is a coil spring 37. By reference to Fig. 3 it may be seen, therefore, that the spring 37 is disposed around the cylinder 38, to the foot portion 38' of which the member 36 is secured in any approved manner. It will be seen, therefore, that the cylinder 38 provides a chamber 39. This cylinder 38 is made of elastic and air-tight material, such as rubber, so as to accommodate itself to the distension and contraction of spring 37.

Extending through the plate 31 so as to open into the chamber 39 is a passage 40 which communicates at the end opposite the chamber 39, with a tube 41, which has one end thereof connected to the plate 31 in any suitable manner as by soldering indicated at 42. A cap 43 is provided on the tube 41 and the cap is threaded into a sleeve 44 by threads 45 oppositely threaded to the threads of the stem 19 so that the sleeve 44 acts as a turnbuckle.

Secured within the cap 43 is a ring 46 which is adapted to bear on a gasket 47. An opening 48 is provided in the gasket 44. It will be seen, therefore, that by turning the sleeve 44 the ring 46 will engage the needle valve 49 so as to depress the same and permit air to flow through the opening 48 into the tube 41, thence into the passage 40 and into the chamber 39 of the cylinder 38 so as normally to hold the contact brush 50 in retracted position so that as the wheel 14 revolves the brush 50 will not engage the stationary contact 51.

As shown in Fig. 3, the brush 50 is carried on the end of an arm 52 on which is provided a threaded portion 53 which is threaded into the piston 34. A screw driver slot 54 is provided in the outer end of the arm 52 so as to permit the arm 52 to be adjusted, when the cap 30 is removed, it being apparent that by adjusting the arm 52 the brush 50 may be moved away from contact 51 when any pressure above a predetermined contact pressure is maintained. This arrangement, therefore, is such that the brush 50 may be disposed in relation to the contact 51 so that the brush 50 will normally be maintained out of wiping engagement with the contact 51 by any predetermined air pressure in the inner tube 11, it being apparent that the air in the tube passes through the opening 48, tube 41, passage 40, and into the chamber 39 so as to normally distend the spring 37 toward the cap 30. It will be apparent, therefore, that when the air pressure in the tire is at the desired normal point the pressure of the air in the tire distends the spring 37 so as to force the arm 52 toward the cap 30, thereby maintaining the brush 50 out of wiping engagement with the contact 51. As shown in Fig. 3, the arm 52 is slidable through aligned openings 83 and 55 and in the plate 31 and the brake drum 23, respectively. As shown in Fig. 3 the arm 52 is provided with a head 82 in which is a tool receiving slot 54. This head 82 is flush against the shoulder 81 whenever the brush 50 is in wiping contact with contact 51. Thus the brush 50 cannot be pulled further into the brake drum than is necessary to make contact and close circuit.

The contact 51 is carried by a supporting member 56 which extends through a bushing 60 which is secured to the mud guard 27 by means of a suitable nut structure 57, it being apparent, as shown in Fig. 2, that the contact 51 is suitably insulated as at 58 and 59 from the bushing 60. The contact 57 associated with each wheel is preferably connected by means of the member 56 and a suitable insulated conductor 61 to one terminal 62 of the horn 16, as shown in Fig. 6. The other terminal 63 of the horn 16 is connected by a conductor 64 to a conductor 65 which is attached as at 66 to one terminal of a suitable switch, the movable arm 67 of this switch being connected by means of a conductor 68 to one side of the battery 69. The circuit is grounded as at 80, through brush 50, arm 52, piston 34, housing 28, plate 31 and the brake drum 23. Suitable electric bulbs 70, 71, 72 and 73 are mounted in a suitable frame 74 on the instrument board 17 and, as shown in Fig. 6, each of these bulbs is connected between conductor 65 and a conductor 75 that is attached to the conductor 61, it being understood that, as shown in Fig. 5, the bulb 70 is associated with the left rear wheel, bulb 71 is associated with the right rear wheel, bulb 72 with the right front wheel, and bulb 73 with the left front wheel. While the wiring diagram illustrated in Fig. 6 for bulb 70 is the same as provided for the bulbs 71, 72, and 73, it is to be understood that the horn 16 is not necessarily connected as shown in Fig. 6 but may be dispensed with if desired and only the electric signal bulbs used.

There is provided in the plate 31 a boss 76 in which is a passage 77 which opens into the passage 40. Threadedly mounted in the boss 76 is an auxiliary valve structure generically indicated at 78 which permits the tire to be inflated without removing the tube 41 since by removing the cap 79 air may be pumped through the valve 78, passage 77, passage 40, tube 41, opening 48, valve 20, and valve stem 19 into the inner tube 11.

It is apparent, therefore, that when the pressure in the tire falls below normal the spring 37 will contract so as to force the piston 34 and arm 52 away from the cap 30 and thereby force brush 50 toward contact 51 so that as the wheel 14 revolves brush 50 will engage contact 51 to close circuit to the horn 16 and one of the light bulbs, for example, bulb 70, the circuit being closed in the following manner: The contact brush 50 is grounded through arm 52, piston 34, housing 28, plate 31, brake drum 33, and through the frame of the car as indicated at 75 in Fig. 6. When brush 50 engages contact 51, therefore, circuit will be closed through conductor 61 to terminal 62 of horn 16, through terminal 63 of horn 16, conductors 64 and 65 to one side of bulb 70, or one of the other bulbs, the outer side of the bulb having circuit closed thereto by means of conductor 75, it being understood that switch arm 67 is normally closed. Manifestly, therefore, when the pressure in one of the tires falls below the desired normal pressure the particular one of the bulbs 70, 71, 72 and 73 associated with the tire will be illuminated to apprise the driver of the condition of the air pressure in the tire, while at the same time the horn 16 will be sounded so as further to apprise the driver of the machine of the fact that the air pressure in one or more of his tires has fallen below normal. When the driver notices the signal showing a low tire pressure he may switch all signals off by operating switch 67.

It will be seen, by referring to Fig. 3, that the cap 30 may be taken off the housing 28. It will likewise be apparent that the set screw 52 may be adjusted in the piston 34. When, therefore, a higher pressure than that at which the head 82 abuts shoulder 81 is placed in the tire the spring 37 will be distended and arm 52 and brush 50 will be pushed away from contact point 51 since whenever head 82 is against shoulder 81 the brush 50 is in contact with contact point 51. Thus the adjustment of arm 52 raises or lowers the pressure at which a signal will be shown in one of the lights 70, 71, 72, or 73. Thus if it is desired to maintain the device in such a manner that a drop below a predetermined air pressure in the tire, down to for example, say thirty pounds, will apprise the driver of such fall in air pressure, set screw 52 is adjusted so that the head 82 will just touch the shoulder 81 at thirty pounds. Then a higher pressure than thirty pounds is placed in the tire and the spring 37 thus distended and brush 50 drawn away from contact 51. Thus the pressure at which the signal will be given can be determined by turning arm 52 to right or left by means of a screw driver inserted in slot 83. Manifestly, therefore, when it is desired to apprise the driver only when a fall in air pressure to a pressure above thirty pounds occurs the set screw 52 may be adjusted to the left (Fig. 3). Then when the tire pressure is greater than this predetermined pressure the spring 37 will be distended and draw brush 50 away from contact 51.

From the foregoing description of my invention it will be seen that I have provided an improved device for indicating when the air pressure in a tire falls below normal and it will be apparent to persons skilled in the art that my improved device while being simple in construction and therefore economical in manufacture is highly efficient in accomplishing its salient object as pointed out hereinbefore.

While I have illustrated and described the preferred form of construction for carrying my invention into effect, this is capable of variation and modification, without departing from the spirit of the invention. I, therefore, do not wish to be limited to the precise details of construction set forth, but desire to avail myself of such variations and modifications as come within the scope of the appended claim.

Having thus described my invention, what I claim as new and desire to protect by Letters Patent is:

A pneumatic pressure responsive switch comprising a housing, an expansible elastic cylinder in the housing having a closed movable end and a fixed open end adapted for communication with a source of pneumatic pressure adapted to distend the cylinder, a piston attached to the closed movable end of the cylinder, a coil spring arranged about said cylinder having one end attached to said piston and having its other end fixed at the closed end of the cylinder so as to tend to contract the cylinder against said pressure, a stop element on the inner wall of the housing, and a circuit closing element adjustably mounted in said piston having a portion for engagement with said stop element.

In testimony whereof I affix my signature.

WILLIAM C. EDWARDS.